(12) United States Patent
Ehrne (10) Patent No.: US 9,957,745 B2
(45) Date of Patent: May 1, 2018

(54) CLOSURE DEVICE FOR THE VACUUM-TIGHT CLOSURE OF AN OPENING IN A WALL

(71) Applicant: VAT Holding AG, Haag (CH)

(72) Inventor: Florian Ehrne, Frumsen (CH)

(73) Assignee: VAT Holding AG, Haag (CH)

( * ) Notice: Subject to any disclaimer, the term of this patent is extended or adjusted under 35 U.S.C. 154(b) by 0 days. days.

(21) Appl. No.: 15/404,386

(22) Filed: Jan. 12, 2017

(65) Prior Publication Data
US 2017/0204647 A1   Jul. 20, 2017

(30) Foreign Application Priority Data
Jan. 19, 2016 (AT) .................... A 15/2016

(51) Int. Cl.
| | | |
|---|---|---|
| F16K 3/18 | (2006.01) | |
| E05F 15/57 | (2015.01) | |
| E05F 5/08 | (2006.01) | |
| F16K 51/02 | (2006.01) | |

(52) U.S. Cl.
CPC ............ *E05F 15/57* (2015.01); *E05F 5/08* (2013.01); *F16K 3/18* (2013.01); *F16K 51/02* (2013.01); *E05Y 2900/60* (2013.01)

(58) Field of Classification Search
CPC .... E05F 15/57; E05F 5/08; F16K 3/18; F16K 51/02; F16K 3/16; E05Y 2900/60
USPC ........ 251/326–329, 193, 158, 215, 229, 187
See application file for complete search history.

(56) References Cited

U.S. PATENT DOCUMENTS

| | | |
|---|---|---|
| 5,641,149 A | 6/1997 | Ito |
| 5,934,646 A | 8/1999 | Tamura et al. |
| 6,045,117 A | 4/2000 | Tamura et al. |
| 6,056,266 A | 5/2000 | Blecha |
| 6,082,706 A | 7/2000 | Irie |

(Continued)

FOREIGN PATENT DOCUMENTS

| | | |
|---|---|---|
| EP | 1061301 | 7/2004 |
| EP | 2605271 | 6/2013 |

(Continued)

*Primary Examiner* — John Bastianelli
(74) *Attorney, Agent, or Firm* — Volpe and Koenig, P.C.

(57) ABSTRACT

A closure device for the vacuum-tight closure of an opening includes a closure element, at least one rod that projects out of a housing of the closure device and that, outside the housing, supports the closure element and that is rigidly connected to a carrier piece, a transmission unit which is adjustable by a drive parallel to the longitudinal adjustment direction between an initial, open position of the closure element, a middle position, in which the closure element assumes the intermediate position, and a closed, end position. At least one spring is arranged between the transmission unit on the carrier piece, and a stop device which, during adjustment of the transmission unit from the middle to the end position, blocks a further adjustment of the carrier piece parallel to the longitudinal adjustment direction. The transmission unit is guided by at least one longitudinal linear guide to be displaceable relative to the housing parallel to a longitudinal adjustment direction, and the carrier piece is guided by at least one oblique linear guide to be displaceable relative to the transmission unit parallel to an oblique adjustment direction.

10 Claims, 10 Drawing Sheets

(56) References Cited

U.S. PATENT DOCUMENTS

| | | |
|---|---|---|
| 6,095,741 A | 8/2000 | Kroeker et al. |
| 6,237,892 B1 | 5/2001 | Ito |
| 6,390,448 B1 | 5/2002 | Kroeker et al. |
| 6,619,618 B2 | 9/2003 | Ishigaki et al. |
| 6,899,316 B2 | 5/2005 | Duelli |
| 6,913,243 B1 | 7/2005 | Tomasch |
| 7,066,443 B2 | 6/2006 | Ishigaki |
| 7,500,649 B2 * | 3/2009 | Litscher ............... F16K 3/0254 251/326 |
| 7,611,122 B2 | 11/2009 | Tichy |
| 7,762,527 B2 | 7/2010 | Schoen et al. |
| 7,980,529 B2 * | 7/2011 | Seitz ..................... F16K 51/02 251/175 |
| 8,177,190 B2 | 5/2012 | Maerk |
| 8,505,875 B2 * | 8/2013 | Mahr ................... F16K 3/0227 251/193 |
| 8,672,293 B2 | 3/2014 | Ehrne et al. |
| 8,960,641 B2 | 2/2015 | Blecha |
| 2007/0272888 A1 * | 11/2007 | Tichy ...................... F16K 3/18 251/63 |
| 2008/0017823 A1 * | 1/2008 | Litscher ............... F16K 3/0254 251/193 |
| 2010/0219362 A1 | 9/2010 | Duelli |
| 2011/0095218 A1 | 4/2011 | Schoch et al. |
| 2012/0258242 A1 | 10/2012 | Tsunoda et al. |
| 2012/0298899 A1 * | 11/2012 | Geiser ................... F16K 3/188 251/158 |
| 2013/0112906 A1 | 5/2013 | Ishigaki et al. |
| 2014/0183391 A1 | 7/2014 | Blecha |
| 2015/0014556 A1 | 1/2015 | Ishigaki et al. |
| 2016/0305555 A1 | 10/2016 | Jee |

FOREIGN PATENT DOCUMENTS

| | | |
|---|---|---|
| EP | 2749798 | 7/2014 |
| JP | 9303578 | 11/1997 |
| JP | H112360 | 1/1999 |
| JP | H11351419 | 12/1999 |
| JP | 2009191924 | 8/2009 |
| KR | 20090112134 | 10/2009 |
| KR | 20110118243 | 10/2011 |
| KR | 1020130113624 | 10/2013 |
| WO | 2009070824 | 6/2009 |
| WO | 2010034046 | 4/2010 |
| WO | 2014075757 | 5/2014 |
| WO | 2016142150 | 9/2016 |
| WO | 2017022968 | 2/2017 |

* cited by examiner

CLOSURE DEVICE FOR THE VACUUM-TIGHT CLOSURE OF AN OPENING IN A WALL

INCORPORATION BY REFERENCE

The following documents are incorporated herein by reference as if fully set forth: Austrian Patent Application No. A 15/2016, filed Jan. 19, 2016.

BACKGROUND

The invention relates to a closure device for the vacuum-tight closure of an opening in a wall, comprising a closure unit, which closure unit has a closure element, which closure element is adjustable parallel to a longitudinal adjustment direction from an open position, that the closure element assumes in an opened state of the closure device, into an intermediate position, and parallel to a transverse adjustment direction, that lies at right angles to the longitudinal adjustment direction, from the intermediate position into a closed position, that the closure element assumes in a closed state of the closure device, and which closure unit has at least one rod that has a longitudinal axis lying parallel to the longitudinal adjustment direction and that projects out of a housing of the closure device and that, outside the housing, supports the closure element and that is rigidly connected to a carrier piece, a transmission unit that, by way of a drive, is adjustable parallel to the longitudinal adjustment direction between an initial position, in which the closure element assumes the open position, a middle position, in which the closure element assumes the intermediate position, and an end position, in which the closure element assumes the closed position, at least one spring that is arranged between the transmission unit and the carrier piece and that drives the carrier piece along during the adjustment of the transmission unit from the initial position into the middle position, with the carrier piece being adjusted relative to the housing in the longitudinal adjustment direction, and a stop device that, during the adjustment of the transmission unit from the middle position into the end position, blocks a further adjustment of the carrier piece parallel to the longitudinal adjustment direction, with the carrier piece being adjusted relative to the housing in the transverse adjustment direction.

A closure device for the vacuum-tight closure of an opening in a wall may also be referred to as a vacuum valve. If the opening is arranged on the wall of a vacuum chamber and the closure element is situated on the outer side of the chamber wall in the surroundings space surrounding the vacuum chamber, such a type of vacuum valve is also referred to as a vacuum door. A closure device of said type in the form of a vacuum door can be designed for pressure difference acting only in one direction. Other types of vacuum valves are normally designed for pressure differences acting in both directions. In the case of such closure devices, the closure element is generally arranged in a valve housing which has a valve opening which is closable by the closure element.

Closure devices in the case of which, in order to close the opening, the closure element is firstly adjusted, in a longitudinal adjustment direction lying parallel to the rod, from an open position into an intermediate position in which the closure element covers the opening but is still raised from the wall, and is subsequently adjusted in a transverse direction lying at least substantially at right angles to the longitudinal adjustment direction and is pressed against the wall, are also referred to as L-valves.

In a non-generic type of construction of L-valves, the rod is mounted so as to be pivotable about an axis perpendicular to the longitudinal adjustment direction, in order to permit the adjustment of the closure element from its intermediate position into its closed position and back again. For the pivoting of the rod about the axis, use may be made here of slotted guides, such as is known for example from U.S. Pat. No. 6,237,892 B1, U.S. Pat. No. 7,066,443 B2 or US 2012/0258242 A1.

In the case of L valves in which, for the adjustment of the closure element between the intermediate position and the closed position, a parallel displacement of the closure element takes place in a transverse adjustment direction at an angle, in particular at right angles, with respect to the longitudinal adjustment direction, it is the case in a conventional embodiment that drive elements for the adjustment of the closure element between the intermediate position and the closed position are arranged on a carrier unit which supports the closure element, wherein the carrier unit is attached to a rod. Such embodiments of L valves, inter alia in the form of vacuum doors, emerge for example from U.S. Pat. No. 6,056,266 A, U.S. Pat. No. 6,899,316 B2 and U.S. Pat. No. 7,611,122 B2. Here, U.S. Pat. No. 6,056,266 A, U.S. Pat. No. 7,611,122 B2 also disclose sequence controllers for the purposes of ensuring the correct sequence of the actuation of the piston-cylinder units. A further such sequence controller for an L-valve emerges from U.S. Pat. No. 8,177,190 B2.

WO 2010/034046 A1 discloses an L-valve in which a block which serves for displaceably mounting the rod in the longitudinal adjustment direction and to which the drive for the adjustment of the rod in the longitudinal adjustment direction is also attached is mounted so as to be linearly displaceable in a transverse adjustment direction lying at right angles to the longitudinal adjustment direction. This linear displacement is performed by way of piston-cylinder units which act in said direction.

U.S. Pat. No. 7,762,527 B2 presents an embodiment of an L-valve in which the piston-cylinder unit which serves for the adjustment of the closure element in the longitudinal adjustment direction is mounted, by way of a linear guide, so as to be displaceable relative to a valve housing in the transverse adjustment direction lying at right angles to the longitudinal adjustment direction.

WO 2014/075757 A1 discloses a valve in which the rod which supports the closure element is guided so as to be linearly displaceable in the longitudinal adjustment direction. For this purpose, a carrier piece is provided which is connected to the valve rod and which is guided along rod-like guide parts so as to be displaceable in the longitudinal adjustment direction. The rod-like guide parts are displaceable in a transverse direction at right angles to the longitudinal adjustment direction, and can be displaced in the transverse adjustment direction by way of pneumatic piston-cylinder units. For the displacement of the rod in the longitudinal adjustment direction, use is likewise made of pneumatic piston-cylinder units, the piston rods of which are connected to the carrier piece, wherein said connection permits mobility of the transmission piece relative to the piston rods in the transverse adjustment direction.

US 2013/0112906 A1 presents a closure device of the type mentioned in the introduction. The closure element is arranged in a valve housing and, in the closed position, closes an opening in the valve housing. For the opening and closing of the closure device, use is made of piston-cylinder units which displays a transmission unit parallel to a longitudinal adjustment direction between an initial position, a middle position and an end position. The transmission unit is formed by a yoke to which left-hand and right-hand cam drivers, which protrude in the longitudinal adjustment direction, are fixed. In a respective cam driver there is arranged in each case one first cam recess, which extends in the longitudinal adjustment direction, and one second cam recess, which extends in the oblique adjustment direction. Control cams which are arranged fixedly on a housing engage into the first cam recesses. Control cams which are arranged on a carrier piece which is rigidly connected to a rod which supports the closure element engage into the second cam recesses. A spring is arranged between the yoke of the transmission unit and the carrier piece. This yoke drives the carrier piece along during the adjustment of the transmission unit from the initial position into the middle position. During a further displacement of the transmission unit from the middle position into the end position, a further movement of the carrier piece in the longitudinal adjustment direction is blocked, and the carrier piece is adjusted in the transverse adjustment direction lying at right angles to the longitudinal adjustment direction. In this way, the rod, and with it the closure element, are also displaced parallel to the transverse adjustment direction in order to move the closure element into the closed position. In the case of said closure device, it appears to be difficult to realize a smooth movement sequence with little play without great outlay in terms construction.

A similar closure device emerges from EP 1 061 301 A2. Here, however, during the adjustment of the transmission unit from the middle position into the end position, the rods which support the closure element pivot about an axis lying at right angles to the longitudinal adjustment direction. Such pivoting has disadvantages in relation to a parallel displacement of the closure element, for example with regard to uniform compression of the seal of the closure element in the closed position thereof.

US 2015/0014556 A1 discloses a further closure device which is similar to the closure device of US 2013/0112906 A1. A difference of the closure device in this document consists in that first and second closure elements are provided, by way of which openings in opposite walls can be selectively closed off.

JP H112360 A discloses a closure device in the case of which an adjustment of the closure element from an open position via an intermediate position into a closed position is likewise realized by way of a drive acting in a longitudinal direction. The adjustment of the closure element from the intermediate position into the closed position is in this case realized by virtue of the valve rod to which the closure element being pivoted, by virtue of first cams being displaced in first slots extending parallel to the longitudinal direction and second cams being displaced in second slots extending obliquely with respect to the longitudinal direction.

SUMMARY

It is an object of the invention to provide an advantageous closure device of the type mentioned in the introduction which can be produced in a simple manner.

According to the invention, this is achieved by way of a closure device for the vacuum-tight closure of an opening in a wall, comprising a closure unit, which closure unit has a closure element, which closure element is adjustable parallel to a longitudinal adjustment direction from an open position, which the closure element assumes in an opened state of the closure device, into an intermediate position, and parallel to a transverse adjustment direction, which lies at right angles to the longitudinal adjustment direction, from the intermediate position into a closed position, that the closure element assumes in a closed state of the closure device, and which closure unit has at least one rod which has a longitudinal axis lying parallel to the longitudinal adjustment direction and that projects out of a housing of the closure device and that, outside the housing, supports the closure element and that is rigidly connected to a carrier piece, a transmission unit which, by way of a drive, is adjustable parallel to the longitudinal adjustment direction between an initial position, in which the closure element assumes the open position, a middle position, in which the closure element assumes the intermediate position, and an end position, in which the closure element assumes the closed position, at least one spring that is arranged between the transmission unit and the carrier piece and that drives the carrier piece along during the adjustment of the transmission unit from the initial position into the middle position, with the carrier piece being adjusted relative to the housing in the longitudinal adjustment direction, and a stop device that, during the adjustment of the transmission unit from the middle position into the end position, blocks a further adjustment of the carrier piece parallel to the longitudinal adjustment direction, with the carrier piece being adjusted relative to the housing in the transverse adjustment direction, wherein the closure device comprises at least one longitudinal linear guide and at least one oblique linear guide that have in each case a guide rail and a carriage which is mounted so as to be linearly displaceable along the guide rail, the guide rail of the longitudinal linear guide being arranged parallel to the longitudinal adjustment direction and the guide rail of the oblique linear guide being arranged parallel to an oblique adjustment direction which, in a plane spanned by the longitudinal adjustment direction and transverse adjustment direction, lies at an angle with respect to the longitudinal adjustment direction and at an angle with respect to the transverse adjustment direction, the transmission unit being guided by the at least one longitudinal linear guide so as to be displaceable relative to the housing parallel to the longitudinal adjustment direction, and the carrier piece being guided by the at least one oblique linear guide so as to be displaceable relative to the transmission unit parallel to the oblique adjustment direction.

In the case of the closure device according to the invention, it is advantageously possible for conventional linear guides, such as are used in large numbers as standard components in mechanical engineering, to be used for the at least one longitudinal linear guide and at least one oblique linear guide. Such linear guides are inexpensive, exhibit smooth movement and have little play or no play (by virtue of being preloaded). In particular, the carriage of a linear guide of this type is mounted relative to the guide rail by way of ruling bodies, for example by way of encircling rolling-body guides or by way of ruling bodies guided in raceway cages. Sliding guidance of the carriage relative to the guide rail is also possible.

During the closing of the closure device, when the transmission unit reaches the middle position, the closure unit is braked by way of the stop device. To dampen said braking, the stop device advantageously has an abutment spring that, when the stop device takes effect, is deformed from a basic position into a working position by a stop part which abuts against the abutment spring. Here, the abutment spring expediently has a spring leg, which spring leg, during the deformation of the abutment spring from the basic position into the working position, is deflected through a spring travel, and here, in the basic position of the abutment spring, said spring leg is, at least in a section in which the stop part abuts against the spring leg during the closing of the closure device, spaced apart from a rigid support part, and in the working position of the abutment spring, said spring leg bears, in said section, against the support part. The abutment part may for example be a bolt that is attached to a section of the rod, which bolt protrudes from the carrier piece on that side of the carrier piece that is situated opposite the closure element. It is thereby possible to realize structurally simple and effective damping of the braking of the closure unit.

In an advantageous embodiment of the invention, the closure device is in the form of a vacuum door. A vacuum door of said type may be installed on the outer side of a chamber wall of a vacuum chamber, and is thus situated outside the vacuum chamber in a surroundings space surrounding the vacuum chamber. In the closed state of the closure device, the closure element on the outer side of the chamber wall is pressed against the chamber wall in a region surrounding the opening. A vacuum door of said type may be designed for sealing off only a pressure difference acting from the surroundings space in the direction of the interior space of the vacuum chamber. It would instead also be possible for the closure device to be in the form of a vacuum valve in the case of which the closure element is arranged in a valve housing. The closure device may then be resistant to pressure differences in both directions (up to the level of atmospheric pressure).

BRIEF DESCRIPTION OF THE DRAWINGS

Further advantages and details of the invention will be discussed below on the basis of the appended drawing, in which.

DETAILED DESCRIPTION OF THE PREFERRED EMBODIMENTS

An exemplary embodiment of a closure device according to the invention is illustrated in FIGS. 1 to 30.

The closure device has a closure element 1 which is in particular of plate-like form and which is borne by a rod 2. In the exemplary embodiment, the connection between rod 2 and closure element 1 is realized by way of a connecting piece 3. A direct fastening of the closure element 1 to the rod 2 is conceivable and possible.

By way of the closure element 1, and opening 4 in a wall 6 can be sealed off in a closed state of the closure device and can be opened up in the opened state of the closure device. The wall 6 is for example a part of a vacuum chamber which is not otherwise illustrated in the figures. For this purpose, the closure device may be fastened to the outer side, averted from the interior space of the vacuum chamber, of the wall 6, for example by way of screws 7 which extend through a housing 8 of the closure device and which are screwed into blind bores with internal threads in the wall.

As will be discussed in more detail further below, for the closing of the closure device proceeding from an open position of the closure element 1 which the closure element 1 assumes in the opened state of the closure device, the closure element is displaced rectilinearly in a longitudinal adjustment direction 9 until an intermediate position is reached, and thereafter, is displaced rectilinearly in a transverse adjustment direction 10 at right angles to the longitudinal adjustment direction, until the closure element 1 reaches a closed position in which the closure device is situated in its closed state.

Thus, in the intermediate position, the closure element 1 covers the opening 4 as viewed in the direction of the axis 5 of the opening 4 but is raised (spaced apart) from the wall 6. In the closed position, the closure element 1 is pressed against a seat 11 surrounding the opening 4. In the exemplary embodiment, said seat 11 is formed by a sealing surface against which an elastic sealing ring 12 (composed for example of FKM or FFKM) arranged on the closure element 1 is pressed. It would basically also be possible for the sealing ring 12 to be arranged on the seat 11 and for the sealing surface to be arranged on the closure element 1.

The rod 2 has a longitudinal axis 13 which lies parallel to the longitudinal adjustment direction 9. The displacement of the closure element 1 from the open position into the intermediate position is realized by way of a parallel displacement of the road 2 in the direction of its longitudinal axis 13.

In the closed position of the closure element 1, the opening 4 is closed in vacuum-tight fashion. This means that, in a vacuum region which is situated on that side of the wall 6 which is situated opposite the closure element 1, which vacuum region is hermetically sealed off aside from the opening 4, a vacuum, in particular of lower than 0.1 Pascal, can be maintained over a relatively long period of time, in particular more than one hour, when the closure element 1 is in the closed state.

The rod 2 is rigidly connected to a carrier piece 14. The carrier piece 14, the rod 2, the closure element 1 and the connecting piece 3 that may be provided together form a closure unit 26 (cf. FIG. 30), the parts of which are moved together during the closing and opening of the closure device.

A drive 15 serves for the opening and closing of the closure device, which drive is, in the exemplary embodiment shown, formed by two pneumatic piston-cylinder units. The drive 15 acts on the transmission unit 18. The transmission unit 18 is guided, by way of a first and a second linear guide 19, so as to be displaceable relative to the housing 8 parallel to the longitudinal adjustment direction 9. Those linear guides which guide the transmission unit 18 so as to be displaceable parallel to the longitudinal adjustment direction 9 are, in this document, referred to as longitudinal linear guides 19. The transmission unit 18 can be adjusted by the drive 15 rectilinearly in the longitudinal adjustment direction 9 from an initial position via a middle position into an end position.

In the initial position of the transmission unit 18, the closure element 1 assumes its open position, and in the end position of the transmission unit 18, the closure element 1 assumes its closed position. The adjustment of the closure element 1 from the open position into the intermediate position of the closure element 1 takes place during the displacement of the transmission unit 18 from the initial position into the middle position. The displacement of the closure element 1 from the intermediate position into the closed position of the closure element 1 takes place during the displacement of the transmission unit 18 from the middle position into the end position, as will be discussed in more detail further below.

In the exemplary embodiment, the transmission unit 18 is formed by two side parts 18a, 18b and a connecting part 18c, wherein the piston rod 16 of the two piston-cylinder units engage on the side parts 18a and 18b. A modified design in relation to this, for example also a unipartite design, is also conceivable and possible.

The carrier piece 14 is guided so as to be displaceable relative to the transmission unit 18 parallel to an oblique adjustment direction 21 (cf. in particular FIG. 6) by way of a first and a second linear guide 20. Those linear guides which guide the carrier piece 14 relative to the transmission unit 18 parallel to the oblique adjustment direction 21 are referred to in this document as oblique linear guides 20.

Figure 1:
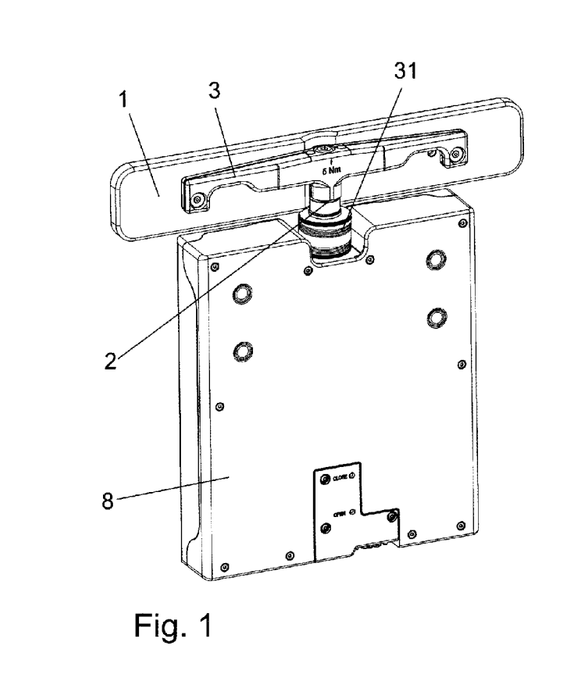
FIGS. 1 and 2 show perspective views of a closure unit according to an exemplary embodiment of the invention.
Figures 2, 18:
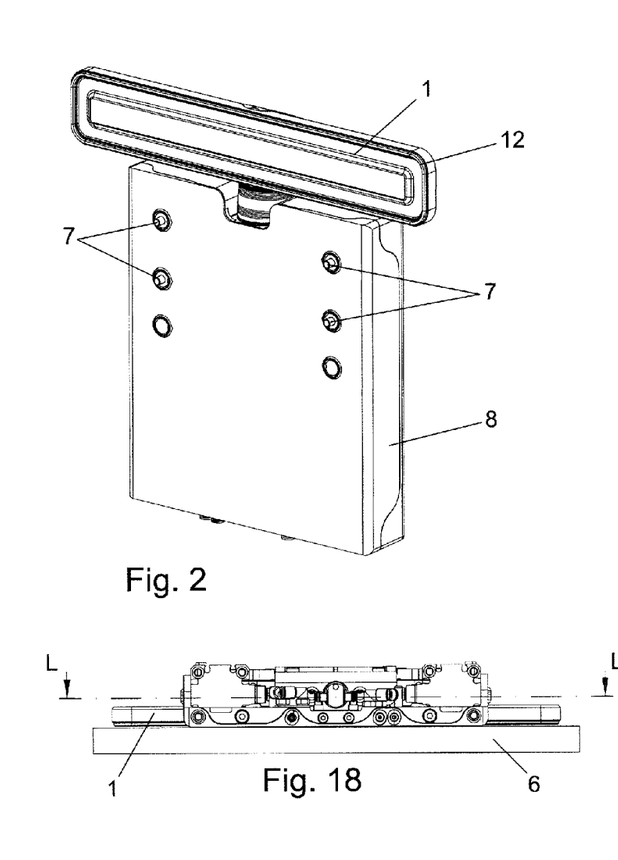
FIG. 18 shows a view from below of the closure unit mounted on a wall, with the closure element in the open position.
Figure 3:
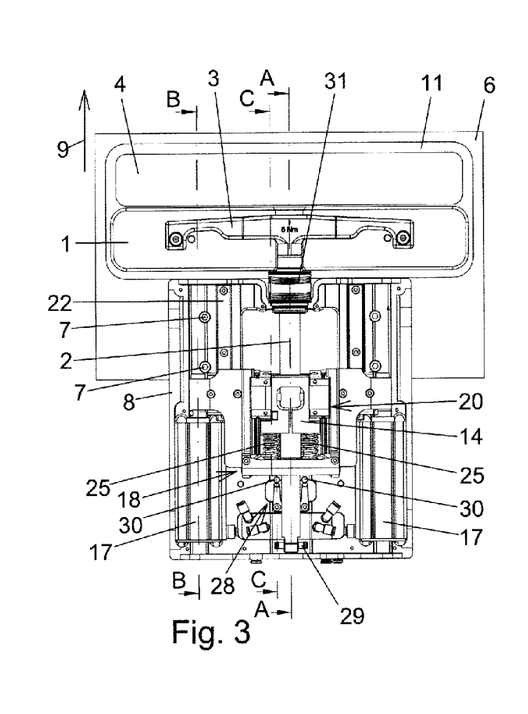
FIG. 3 shows a view of the closure unit mounted on a wall, with a housing cover removed and with the closure element in the open position.
Figures 4, 5, 6, 7:
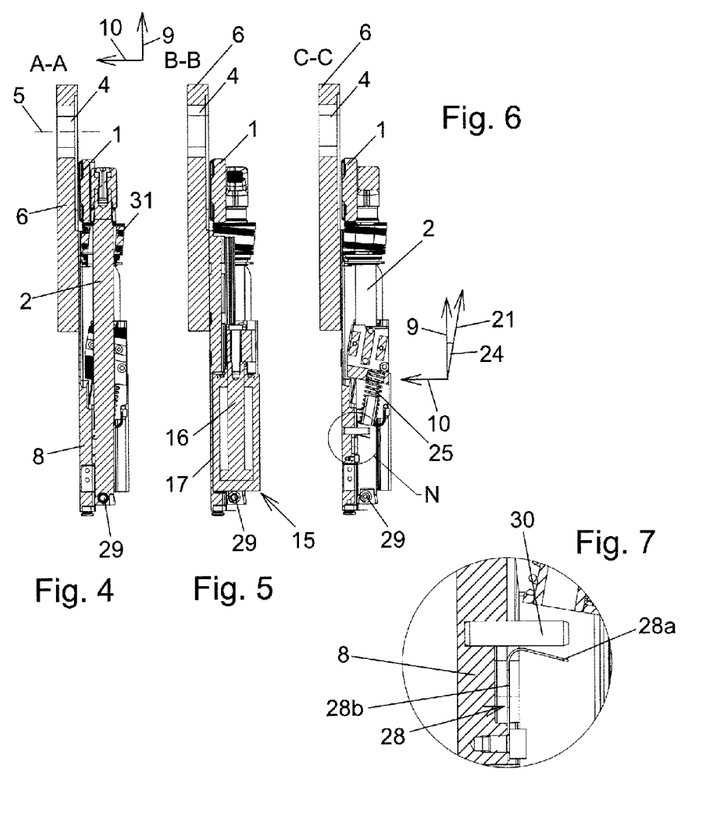
FIGS. 4, 5 and 6 show sections along the lines AA, BB and CC in FIG. 3.
FIG. 7 shows an enlarged detail N of FIG. 6.
Figure 8:
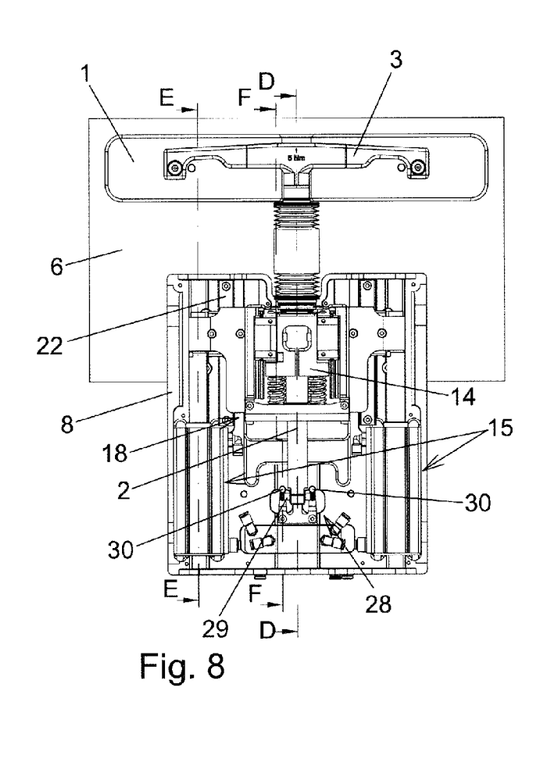
FIG. 8 shows a view similar to FIG. 3 with the closure element in the intermediate position.
Figure 9:
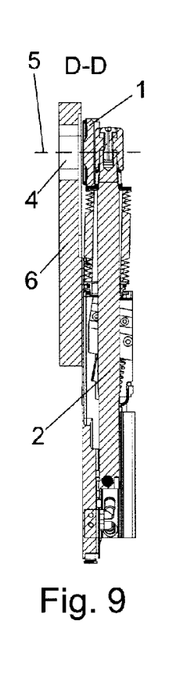
FIGS. 9, 10 and 11 show sections along the lines DD, EE and FF in FIG. 8.
Figure 10:
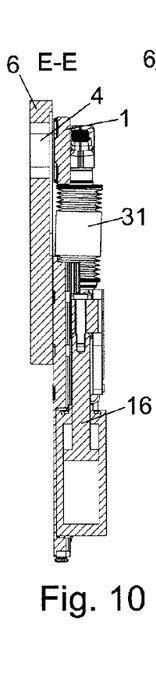
Figures 11, 12:
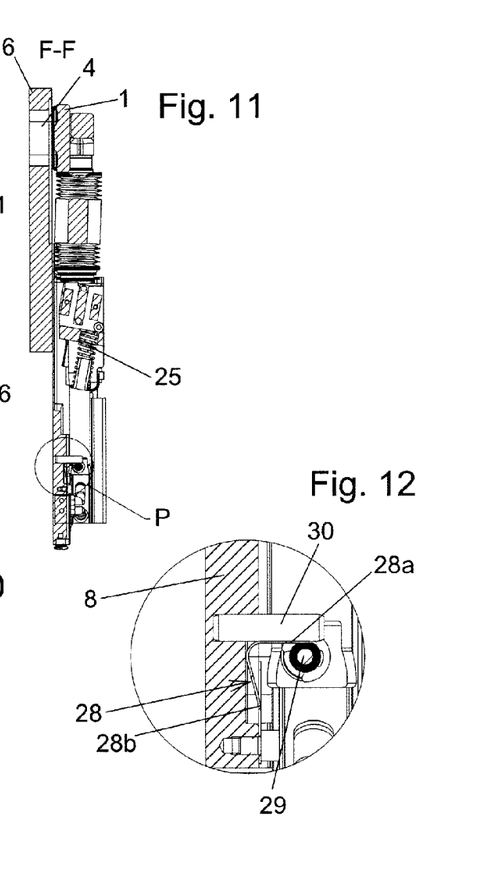
FIG. 12 shows an enlarged detail P of FIG. 11.
Figures 13, 14:
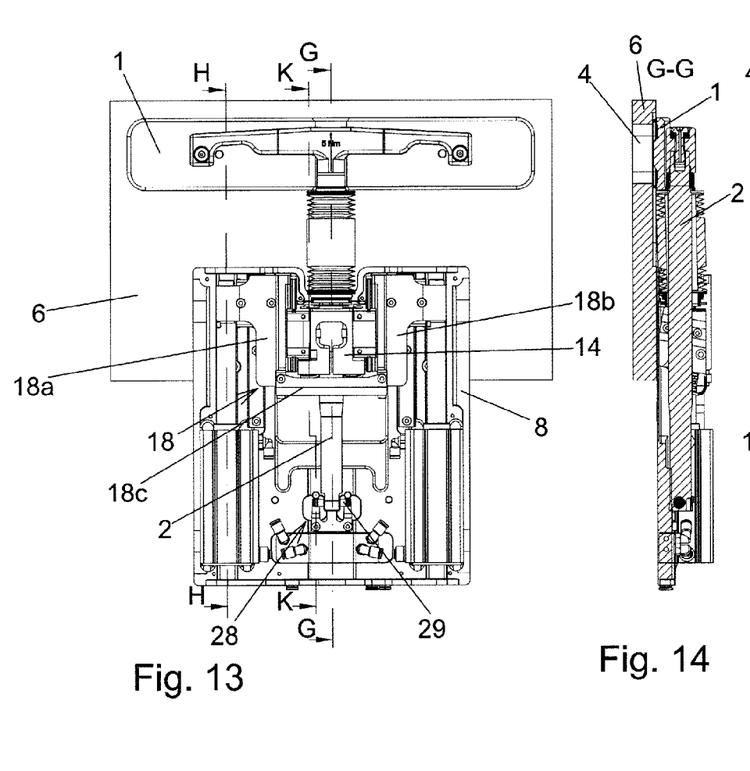
FIG. 13 shows a view analogous to FIG. 3 in the closed position of the closure element.
FIGS. 14, 15 and 16 show sections along the lines GG, HH and KK of FIG. 13.
Figure 15:
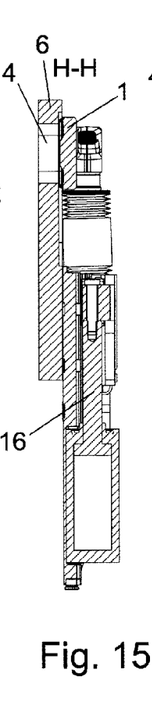
Figure 16:
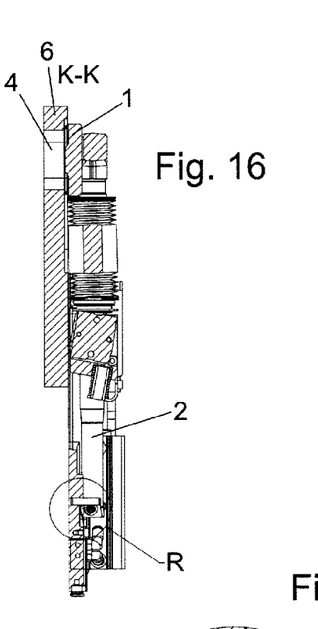
Figure 17:
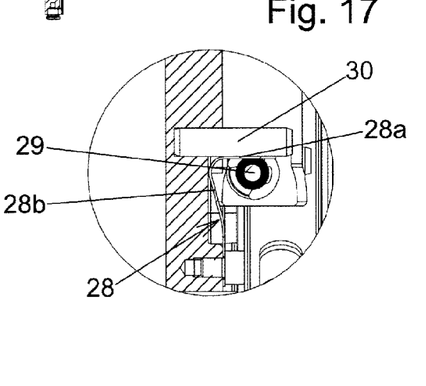
FIG. 17 shows an enlarged detail R of FIG. 16.
Figures 19, 20, 21, 22:
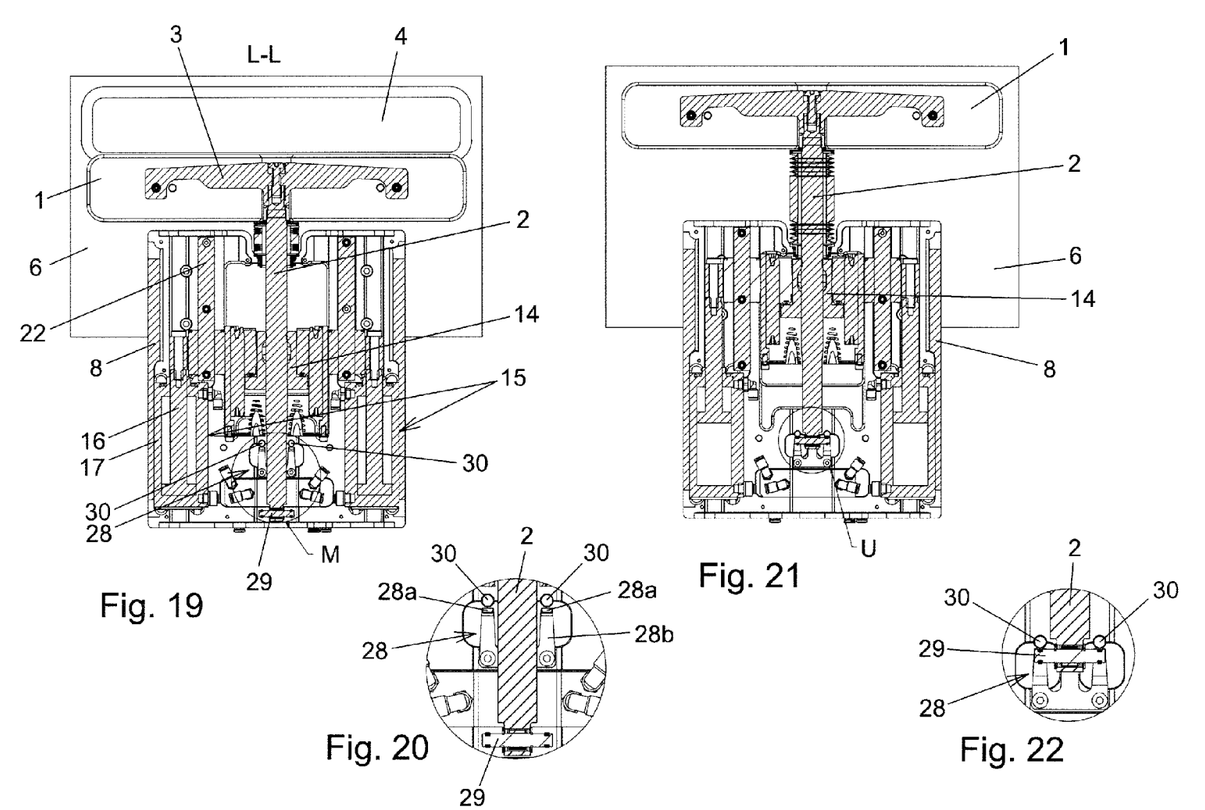
FIG. 19 shows a section along the line LL in FIG. 18.
FIG. 20 shows an enlarged detail M of FIG. 19.
FIG. 21 shows a section analogous to FIG. 19, but with the closure element in the intermediate position.
FIG. 22 shows an enlarged detail U of FIG. 21.
Figures 23, 24:
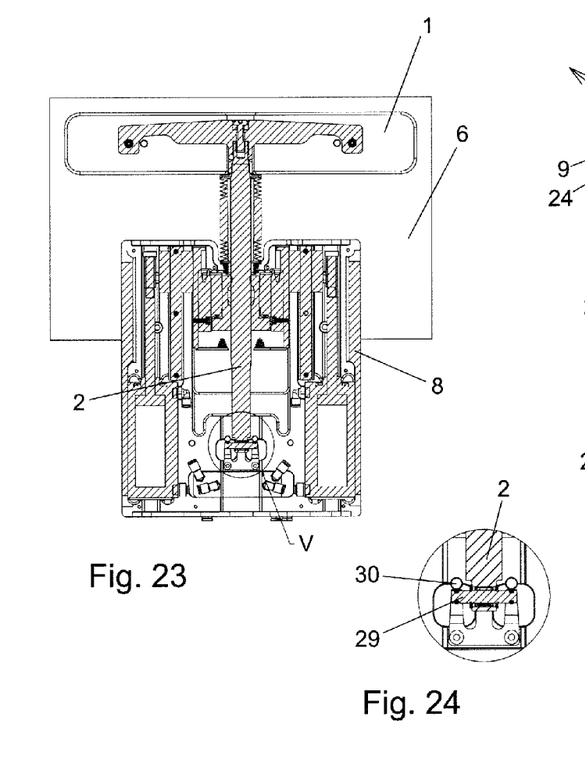
FIG. 23 shows a section analogous to FIG. 19, but with the closure element in the closed position.
FIG. 24 shows an enlarged detail V of FIG. 23.
Figure 25:
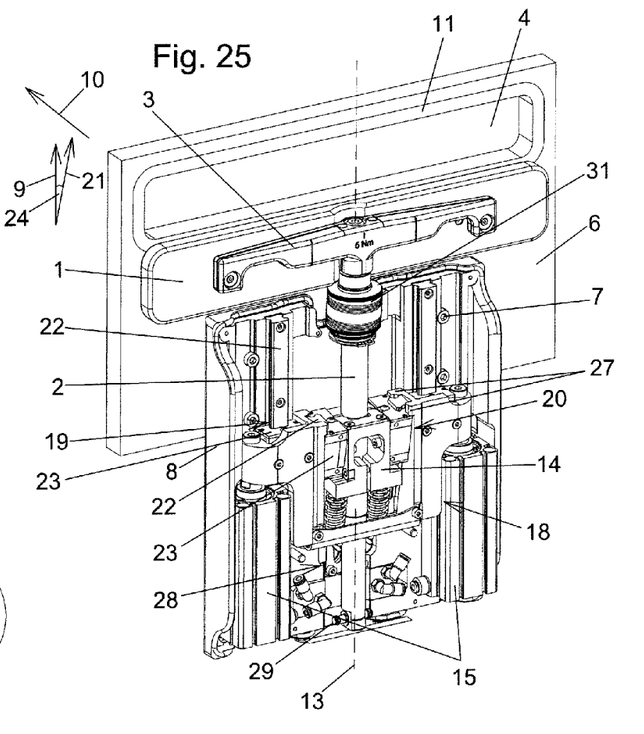
FIGS. 25, 26 and 27 show perspective views of the closure device mounted on a wall, with a housing cover removed and with the closure element in the open position, intermediate position and closed position.
Figure 26:
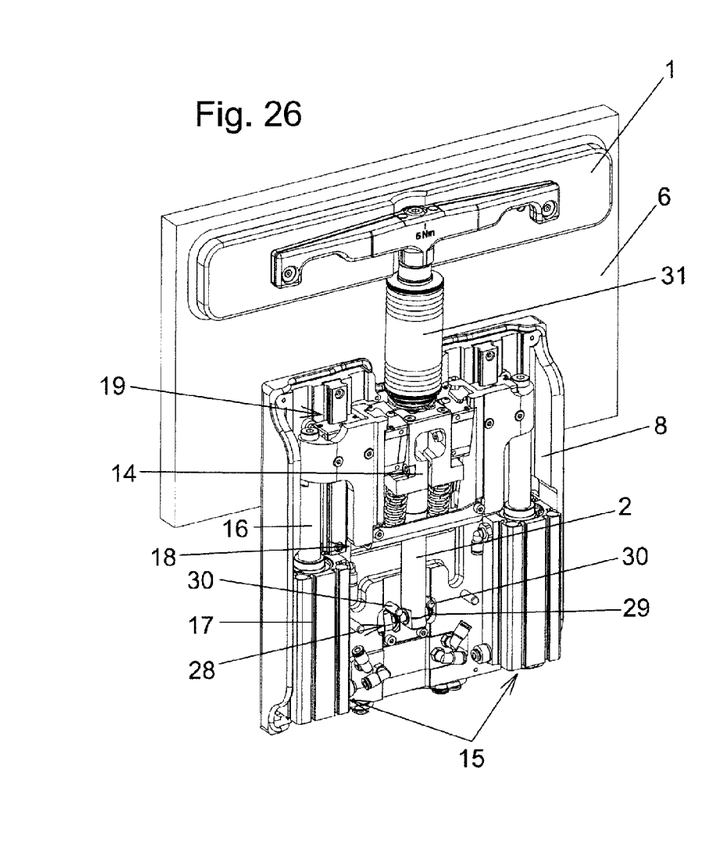
Figure 27:
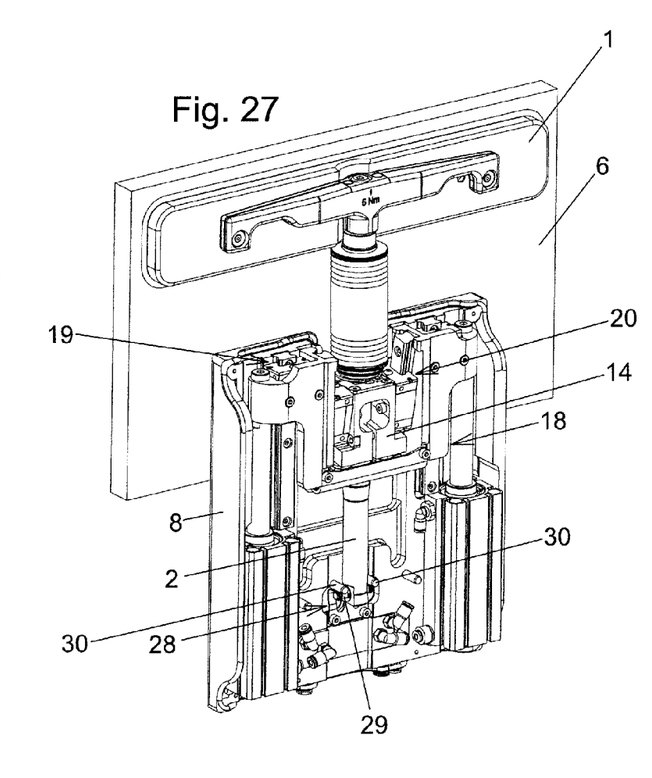
Figure 28:
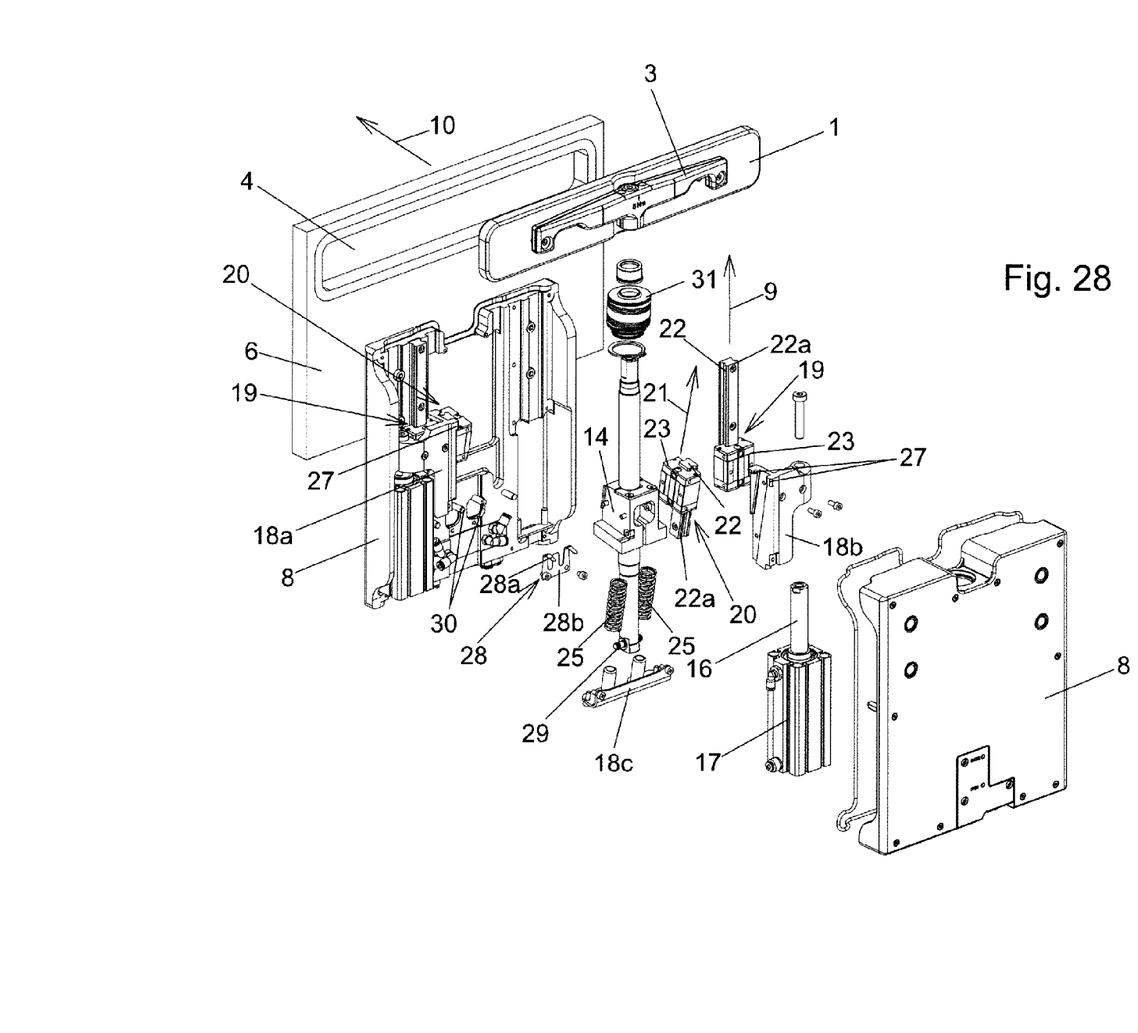
FIGS. 28 and 29 are exploded illustrations from different viewing directions.
Figure 29:
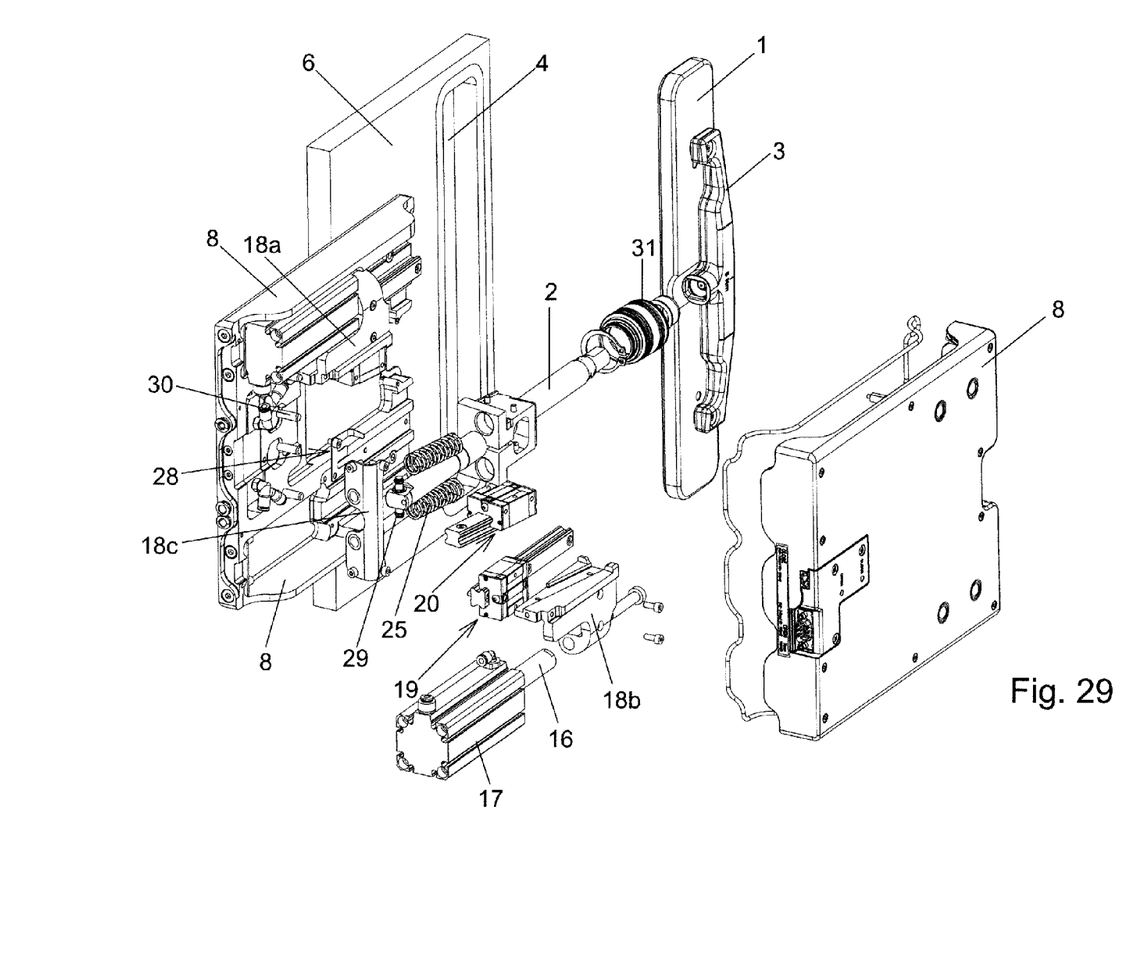
Figures 30, 31:
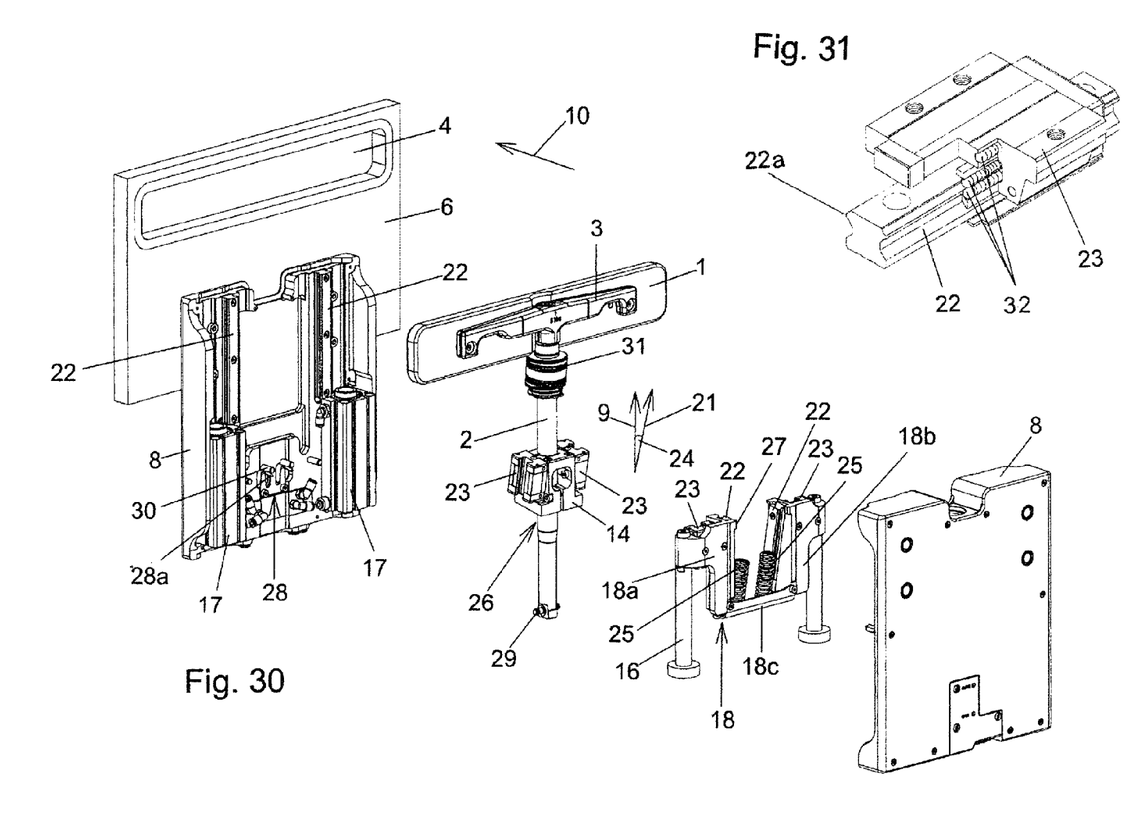
FIG. 30 is an exploded illustration from the same viewing direction as FIG. 28, with parts which move together being illustrated as units, that is to say not in exploded form (with the exception of the housing cover)
FIG. 31 shows a section of a slightly modified embodiment of a linear guide, with a partially cut-away carriage.

The longitudinal and oblique linear guides 19, 20 are formed in the conventional manner as rail-type guides and have in each case one rectilinearly running guide rail 22 and one carriage (guide carriage) 23 guided displaceably along the longitudinal extent of the guide rail 22. The carriage 23 has a recess by way of which said carriage engages around a widened head region 22a of the guide rail 22. In particular, said cutout is of C-shaped form as viewed in a cross section at right angles to the longitudinal extent of the guide rail 22. The carriage 23 is thus secured in positively locking fashion so as to be prevented from being pulled off the guide rail 22 in all directions at right angles to the longitudinal extent of the guide rail 22. A section of a linear guide which is of slightly modified form in relation to the longitudinal and oblique linear guides 19, 20 as illustrated in the exemplary embodiment in FIGS. 1 to 30, but which could likewise be used for said longitudinal and oblique linear guides 19, 20, is illustrated in FIG. 31, wherein the carriage 23 is illustrated in partially cut-away form. It is thus possible to see the rolling bodies 32, which in this case are in the form of balls. Instead of balls, it would for example also be possible for rollers to be provided as rolling bodies for the rolling bearing action. A displaceable mounting of the carriage 23 relative to the guide rail 22 by way of rolling bodies 32 is preferable. For example, a ball or roller circuit may be provided, or it would be possible for balls or rollers arranged in a cage to be provided as rolling bodies.

A sliding guide of the carriage 23 of the longitudinal linear guides 19 and/or oblique linear guides 20 is basically conceivable and possible in a modified embodiment.

In the case of displaceable guidance of the carriage 23 of the longitudinal linear guides 19 and/or oblique linear guides 20 by way of rolling bodies 32, the respective carriage 23 may be elastically braced with the respective guide rail 22 by way of the rolling bodies 32. It is thereby possible for a degree of play to be avoided.

In the exemplary embodiment shown, in the case of the longitudinal linear guides 19, the guide rails 22 are attached to the housing 8 and the carriages 23 are attached to the transmission unit 18, in particular to the respective side part 18a, 18b of the transmission unit 18, which is advantageous for a compact form of the closure device. It would however basically also be possible for the guide rails 22 to be attached to the transmission unit 18 and the carriages 23 to be attached to the housing 8.

In the exemplary embodiment, in the case of the oblique linear guides, the guide rails 22 are attached to the transmission unit 18, in particular to the two side parts 18a, 18b of the transmission unit 18, and the carriages 23 are attached to the carrier piece 14. It would basically also be possible for the guide rails 22 to be attached to the carrier piece 14 and for the carriages 23 to be attached to the transmission unit 18.

In the exemplary embodiment, the open sides of the carriages 23 of the longitudinal linear guides 19 and the open sides of the carriages 23 of the oblique linear guides 20 point in directions at right angles to one another. Here, the open sides of the carriages 23 of the longitudinal linear guides 19 point in the direction of the wall 6, and the open sides of the carriages 23 of the oblique linear guides point in a direction at right angles to the plane spanned by the longitudinal adjustment direction 9 and the transverse adjustment direction 10. An embodiment in which the open sides of the carriages 23 of the longitudinal linear guides 19 and oblique linear guides 20 point in the same and/or opposite directions is conceivable and possible.

The oblique adjustment device 21 lies in the plane spanned by the longitudinal adjustment direction 9 and transverse adjustment direction 10 (in the plane in which both the longitudinal adjustment direction 9 and the transverse adjustment direction 10 lie). The oblique adjustment direction 21 is in this case at an angle with respect to the longitudinal adjustment direction 9 and at an angle with respect to the transverse adjustment direction 10, that is to say encloses an angle 24 (cf. in particular FIG. 6) not equal to 0° both with the longitudinal adjustment direction 9 and with the transverse adjustment direction 10. The oblique adjustment direction 21 expediently encloses an angle 24 of more than 4° and less than 45° with the longitudinal adjustment direction 9. The angle 24 preferably lies in the range from 5° to 20°.

Between the transmission unit 18 and the carrier piece 14 there are arranged springs 25 which, during the closing of the closure device, couple the carrier piece 14 to the transmission unit 18, and which could thus also be referred to as "coupling springs". The springs 25 are subjected to compression loading during the closing of the closure device, and thus act as compression springs. An embodiment in which the springs 25 act as tensile springs during the closing of the closure device is also conceivable and possible.

In the exemplary embodiment, two springs 25 are provided. It would also be possible for only one spring 25 to be provided, or for more than two springs 25 to be provided.

The at least one spring 25 is preferably, as illustrated, in the form of a helical spring, the longitudinal extent of which runs parallel to the oblique adjustment device 21. Other embodiments of springs, for example in the form of packs of spring washers, are conceivable and possible.

In the initial position of the transmission unit 18, which can be seen in FIGS. 3 to 6, 19 and 25, the closure element 1 assumes its open position, as already mentioned. For the closing of the closure device, the transmission unit 18 is, by way of the drive 15, displaced parallel to the longitudinal adjustment direction 9 from the initial position in the direction of its end position. Here, the carrier piece 14 is initially driven along by the at least one spring 25, that is to say the carrier piece 14 is displaced parallel to the longitudinal adjustment direction 9, uniformly with the transmission unit 18. When the transmission unit 18 has reached the middle position, the closure element 1 assumes its intermediate position. This state of the transmission unit 18 can be seen in FIGS. 8 to 11, 21 and 26.

When the transmission unit 18 is, by way of the drive 15, displaced parallel to the longitudinal adjustment direction 9 beyond the middle position and further in the direction of its end position, a further displacement of the carrier piece 14 parallel to the longitudinal adjustment direction is blocked by the stop device 28, 29 discussed in more detail further below. A relative displacement of the transmission unit 18 relative to the carrier piece 14 thus now takes place, wherein the at least one spring 25 is compressed (if, in another exemplary embodiment, the at least one spring 25 were designed as a tensile spring, it would be stretched). This relative displacement of the carrier piece 14 relative to the transmission unit 18 is positively guided by way of the oblique linear guides 20. During the displacement of the transmission unit 18 from the middle position into the end position, a displacement of the carriage 23 of the oblique linear guide 20 along the guide rails 22 of the oblique linear guide 20 thus occurs. This results in a displacement of the carrier piece 14, and thus of the closure unit 26 as a whole, relative to the housing 8 in the transverse adjustment direction 10. The closure element 1 is thereby displaced in the direction of the wall 6 and pressed against the latter in order to close the opening 4. The end position of the transmission unit 18 is illustrated in FIGS. 13 to 16, 23 and 27.

The entire closing process of the vacuum valve is thus performed by way of a rectilinear displacement of the transmission unit 18 from the initial position to the end position of the transmission unit 18. Here, from the initial position to be middle position of the transmission unit 18, no relative displacement between the carrier piece 14 and the transmission unit 18 takes place. From the middle position to the end position of the transmission unit 18, the carrier piece 14 is displaced relative to the transmission unit 18 along the oblique adjustment direction 21 predefined by the oblique linear guides 20.

During the opening of the closure device, the described movement process takes place in the reverse sequence. Here, a stop is provided which limits the displacement of the carrier piece 14 relative to the transmission unit 18 and which takes effect when the transmission unit 18 reaches its middle position proceeding from its end position. This stop is, in the exemplary embodiment, realized by a projection 27 of the transmission unit 18, against which projection the carriage 23 of the oblique linear guide 20 abuts. It would also be possible for a stop of said type to be formed in some other way, for example between the guide rail 22 and the carriage 23 of the respective oblique linear guide 20. It is basically also conceivable and possible for a stop of said type to be omitted, and for the carrier piece 14 to be driven along by the at least one spring 25, which would then, in the present exemplary embodiment, act as a tensile spring during the opening of the closure device.

For the sake of clarity, in the illustration of FIG. 30, those elements which move together are illustrated in the connected-together state. Thus, the parts of the closure unit 26 and the carriage 23, attached to the carrier piece 14, of the oblique linear guides 20 are illustrated as a unit. The transmission unit 18 and the carriages 23, attached to said transmission unit, of the longitudinal linear guides 19, the guide rails 22, attached to said transmission unit, of the oblique linear guides 20, and the piston rods 16 engaging on said transmission unit, are likewise illustrated as a unit. The guide rails 22 of the longitudinal linear guides 19 are illustrated as being attached to the housing 8, as are the cylinders 17.

To dampen the braking of the closure unit (that is to say to reduce the deceleration or an occurring impact), the stop device has an abutment spring 28. In the open position of the closure element 1, said abutment spring 28 is unloaded and assumes a non-deformed basic position. When the closure device is closed, an abutment part 29 abuts against the stop spring 28 and deforms the latter into a working position; specifically, said stop action and said deformation occur in a final section of the adjustment travel of the transmission unit 18 from the initial position into the middle position.

The abutment spring 28 has spring legs 28a which interact in each case with the abutment part 29. The respective spring leg 28a can be deflected through a spring travel by the stop part 29. Here, in the basic position of the abutment spring 28, the latter is, at least in that section of its extent in which the stop part 29 abuts against it during the closing of the closure device, spaced apart from a respective rigid support part 30. In the working position of the abutment spring 28, when the spring leg 28a has been deflected by the abutment part 29, then said section of the spring leg 28a bears against the support part 30. The deflection of the spring leg 28a is thus limited by the support part 30.

In the exemplary embodiment, the abutment spring 28 has two spring legs 28a which are assigned in each case one support part 30. It would also be possible for only one spring leg 28a with an associated support part 30 to be provided, or for more than two spring legs 28 with respectively associated support parts 30 to be provided. In the exemplary embodiment, the support parts are formed by bolts which are attached to a base wall of the housing 8 and project from the latter, wherein it would also be possible for the support parts 30 to be embodied in a different, modified form, and also for a common support part to be provided for more than one spring leg 28a. The at least one spring leg 28a encloses an angle of greater than 45° with the longitudinal adjustment direction 9 (both in the basic position and in the working position of the abutment spring 28).

An expedient refinement of the abutment spring 28 provides that the latter has a plate-like base part 28b to which the at least one spring leg 28a is connected by way of a bend. The plate-like base part 28b may be directly screwed to the housing 8. In the basic state of the abutment spring 28, the spring leg 28a encloses an angle which expediently lies in the range between 45° and 80° with the base part 28b. In the working position of the abutment spring 28, when the spring leg 28a is supported against the stop part 29, said angle may then for example amount to 90°, as illustrated.

In the exemplary embodiment, the stop part 29 is arranged on the rod 2, specifically in a section of the rod which protrudes from the carrier piece 14 on the side averted from the closure element 1, in particular in the region of the free end of said section of the rod 2. The stop part 29 is in this case formed by a bolt which extends through the rod 2, though could also be formed in some other way. In a modified embodiment, it would also be possible for the stop part 29 to be arranged on the carrier piece 14 and to interact with an abutment spring correspondingly mounted on the housing 8.

The housing 8 has an interior space out of which the rod 2 is led. In the exemplary embodiment, the point at which said rod is led out is sealed off by way of the bellows 31 (not shown in detail in the middle section). In this way, particles produced in the housing are prevented from passing through an opening for the rod 2 from the housing interior to the region of the opening 4 in the wall 6.

The transmission unit 18, the carrier piece 14 and the linear guides 19, 20 are arranged in the interior space of the housing 8, with the drive 15 preferably likewise being arranged therein. The housing 8 may be sealed off with respect to the surrounding space, or may be connected to the surroundings space via a filter, which counteracts the escape of particles from the interior space of the housing. The closure device may thus be suitable in particular for use under clean room conditions.

Various modifications to the illustrated exemplary embodiment of the invention are conceivable and possible without departing from the scope of the invention. For example, in a modified embodiment, it would be possible for only a single piston-cylinder unit to be provided as a drive, or it would be possible for more than two piston-cylinder units to be provided. It would be possible to use drives with actuators other than pneumatic piston-cylinder units, for example electric drives.

If the drive has more than one drive element (actuator), these act in the same direction of movement.

It would also be possible for the transmission unit 18 to be formed by two separate parts, which are displaced synchronously by the drive (for example by way of synchronized actuators).

It would also be possible for the closure unit to comprise more than one rod, wherein the rods are rigidly connected to a common carrier piece. It would also be possible for a respective rod to be rigidly connected to a respective separate carrier piece.

It would basically also be possible for only one longitudinal linear guide to be provided for the linearly displaceable guidance of the transmission unit, or it would be possible for more than two longitudinal linear guides to be provided.

It would basically also be possible for only one oblique linear guide to be provided for the displaceable guidance of the carrier piece 14 relative to the transmission unit 18, or it would be possible for more than two oblique linear guides to be provided.

In the exemplary embodiment, the closure device is in the form of a vacuum door. An embodiment in the form of some other type of vacuum valve is likewise conceivable and possible. For example, said closure device could for example be a vacuum valve which can be arranged between two vacuum chambers. The closure device could thus have a valve housing in which the closure element 1 is arranged, wherein the rod 2 is led out of the valve housing in sealed fashion, in particular by way of a bellows. The opening 4 would then be arranged in a wall of the valve housing, and the valve housing would have a second opening, for example on the opposite wall.

| List of Reference Designations | |
|---|---|
| 1 | Closure element |
| 2 | Rod |
| 3 | Connecting piece |
| 4 | Opening |
| 5 | Axis |
| 6 | Wall |
| 7 | Screw |
| 8 | Housing |
| 9 | Longitudinal adjustment direction |
| 10 | Transverse adjustment direction |
| 11 | Seat |
| 12 | Sealing ring |
| 13 | Longitudinal axis |
| 14 | Carrier piece |
| 15 | Drive |
| 16 | Piston rod |
| 17 | Cylinder |
| 18 | Transmission unit |
| 18a | Side part |
| 18b | Side part |
| 18c | Connecting part |
| 19 | Longitudinal linear guide |
| 20 | Oblique linear guide |
| 21 | Oblique adjustment direction |
| 22 | Guide rail |
| 22a | Head region |
| 23 | Carriage |
| 24 | Angle |
| 25 | Spring |
| 26 | Closure unit |
| 27 | Projection |
| 28 | Abutment spring |
| 28a | Spring leg |
| 28b | Base part |
| 29 | Stop part |
| 30 | Support part |
| 31 | Bellows |
| 32 | Rolling body |

The invention claimed is:

1. A closure device for vacuum-tight closing of an opening in a wall, comprising
a closure unit, said closure unit has a closure element, said closure element is adjustable parallel to a longitudinal adjustment direction from an open position, that the closure element assumes in an opened state of the closure device, into an intermediate position, and parallel to a transverse adjustment direction, which lies at right angles to the longitudinal adjustment direction, from the intermediate position into a closed position, that the closure element assumes in a closed state of the closure device, and said closure unit has at least one rod which has a longitudinal axis lying parallel to the longitudinal adjustment direction and which projects out of a housing of the closure device and which, outside the housing, supports the closure element and is rigidly connected to a carrier piece,
a transmission unit that, by way of a drive, is adjustable parallel to the longitudinal adjustment direction between an initial position, in which the closure element assumes the open position, a middle position, in which the closure element assumes the intermediate position, and an end position, in which the closure element assumes the closed position, at least one spring that is arranged between the transmission unit and the carrier piece and which drives the carrier piece along during an adjustment of the transmission unit from the initial position into the middle position, with the carrier piece being adjusted relative to the housing in the longitudinal adjustment direction, and a stop device that, during an adjustment of the transmission unit from the middle position into the end position, blocks a further adjustment of the carrier piece parallel to the longitudinal adjustment direction, with the carrier piece being adjusted relative to the housing in the transverse adjustment direction, wherein the closure device comprises at least one longitudinal linear guide and at least one oblique linear guide which have in each case a guide rail and a carriage which is mounted so as to be linearly displaceable along the guide rail, the guide rail of the longitudinal linear guide being arranged parallel to the longitudinal adjustment direction and the guide rail of the oblique linear guide being arranged parallel to an oblique adjustment direction which, in a plane spanned by the longitudinal adjustment direction and transverse adjustment direction, lies at an angle with respect to the longitudinal adjustment direction and at an angle with respect to the transverse adjustment direction, the transmission unit being guided by the at least one longitudinal linear guide so as to be displaceable relative to the housing parallel to the longitudinal adjustment direction, and the carrier piece being guided by the at least one oblique linear guide so as to be displaceable relative to the transmission unit parallel to the oblique adjustment direction.

2. The closure device as claimed in claim 1, wherein the carriages are mounted so as to be displaceable relative to the guide rails by rolling bodies.

3. The closure device as claimed in claim 1, wherein the stop device further includes an abutment spring which, in the open position of the closure element, is unloaded and assumes a basic position, and which, in order to dampen braking of the closure unit that occurs during the closing of the closure device, is deformable into a working position.

4. The closure device as claimed in claim 3, wherein the abutment spring has a spring leg, said spring leg, in order to dampen the braking of the closure unit that occurs during the closing of the closure device, is deflectable through a spring travel by a stop part which abuts against the abutment spring, and here, in the basic position of the abutment spring, said spring leg is, at least in a section in which the stop part abuts against the spring leg during the closing of the closure device, spaced apart from a rigid support part, and in the working position of the abutment spring, said spring leg bears, in said section, against the support part.

5. The closure device as claimed in claim 1, wherein the oblique adjustment direction encloses an angle of less than 45° with the longitudinal adjustment direction.

6. The closure device as claimed in claim 1, wherein the oblique adjustment device encloses an angle of more than 4° with the longitudinal adjustment direction.

7. The closure device as claimed in claim 1, wherein the oblique adjustment direction encloses an angle in the range from 5° to 20° with the longitudinal adjustment direction.

8. The closure device as claimed in claim 1, wherein the rod has a longitudinal axis lying parallel to the longitudinal adjustment direction.

9. The closure device as claimed in claim 1, wherein in each case at least one of the longitudinal linear guides and in each case at least one of the oblique linear guides is arranged on both sides of the longitudinal axis of the rod.

10. The closure device as claimed in claim 1, wherein the transmission unit, the carrier piece, the at least one longitudinal linear guide, and the at least one oblique linear guide are arranged in an interior space of the housing.

* * * * *